United States Patent
Soundararajan et al.

(10) Patent No.: US 11,361,369 B2
(45) Date of Patent: Jun. 14, 2022

(54) SYSTEMS AND METHODS FOR GENERATING PURCHASE OUTPUTS BASED ON RECEIVED VOICE INPUT

(71) Applicant: ServiceNow, Inc., Santa Clara, CA (US)

(72) Inventors: Bharath Soundararajan, Fremont, CA (US); Amir Vakili Jafari, San Diego, CA (US); Colby Andrew Blakeman, San Jose, CA (US); Ryan Meonske, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 77 days.

(21) Appl. No.: 16/525,248

(22) Filed: Jul. 29, 2019

(65) Prior Publication Data

US 2021/0035191 A1 Feb. 4, 2021

(51) Int. Cl.
*G06Q 30/00* (2012.01)
*G06Q 30/06* (2012.01)
*G06Q 30/04* (2012.01)

(52) U.S. Cl.
CPC ......... *G06Q 30/0635* (2013.01); *G06Q 30/04* (2013.01); *G06Q 30/0631* (2013.01)

(58) Field of Classification Search
CPC . G06Q 30/0635; G06Q 30/04; G06Q 30/0631
See application file for complete search history.

(56) References Cited

U.S. PATENT DOCUMENTS

| | | |
|---|---|---|
| 6,678,887 B1 | 1/2004 | Hallman |
| 7,020,706 B2 | 3/2006 | Cates |
| 7,386,476 B1 * | 6/2008 | Shavanadan ........... G06Q 30/02 705/26.2 |
| 7,716,353 B2 | 5/2010 | Golovinsky |
| 7,769,718 B2 | 8/2010 | Murley |
| 7,925,981 B2 | 4/2011 | Pourheidari |
| 8,224,683 B2 | 7/2012 | Manos |
| 8,402,127 B2 | 3/2013 | Solin |
| 8,612,408 B2 | 12/2013 | Trinon |
| 8,832,652 B2 | 9/2014 | Mueller |
| 8,983,982 B2 | 3/2015 | Rangarajan |
| 9,065,783 B2 | 6/2015 | Ding |
| 9,098,322 B2 | 8/2015 | Apte |

(Continued)

OTHER PUBLICATIONS

Panigrahy, Saroj Kumar, Debasish Jena, and Sanjay Kumar Jena. "A Secure e-Shopping Using Voice Ordering." International Conference on Business Administration and Information Processing. Springer, Berlin, Heidelberg, 2010.*

*Primary Examiner* — Kathleen Palavecino
(74) *Attorney, Agent, or Firm* — Fletcher Yoder PC

(57) ABSTRACT

The present disclosure relates generally to outputting purchase outputs based on received voice input by a client device. The purchase outputs may include an invoice, a purchase order, a request for funds associated with a purchase of one or more items, and the like. In general, the voice input received by the client invoice is used to generate a purchase request input that includes at least one product that an employee wants to purchase. One or more candidate items are generated based on the purchase request input, which may be sent to a user and/or manager for approval before generating a purchase output based on the candidate items.

12 Claims, 11 Drawing Sheets

(56) References Cited

U.S. PATENT DOCUMENTS

| | | |
|---|---|---|
| 9,122,552 B2 | 9/2015 | Whitney |
| 9,317,327 B2 | 4/2016 | Apte |
| 9,363,252 B2 | 6/2016 | Mueller |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 2010/0023415 A1* | 1/2010 | Brower .................. G06Q 10/06 705/26.1 |
| 2014/0143039 A1* | 5/2014 | Branton ............. G06Q 30/0223 705/14.24 |
| 2017/0032330 A1* | 2/2017 | Shubat .................. H04W 4/021 |
| 2019/0236740 A1* | 8/2019 | Rao ...................... G06Q 10/067 |

\* cited by examiner

| | |
|---|---|
| NUMBER | PR00566066 |
| REQUEST TYPE | PRP – NEW PO |
| SAP PO NUMBER | 000452012 |
| PO TYPE | STANDARD – NB |
| COMPANY CODE | US |
| CURRENCY | USD |

| | |
|---|---|
| REQUEST DATE | 2018-02-13 12:17:00 |
| PRIORITY | 4 – LOW |
| SUBMITTER | COMPANY 1 |
| REQUESTER | COMPANY 1 |
| PO OWNER | COMPANY 1 |
| PRE-TAX TOTAL AMOUNT | 83,210 |
| PRE-TAX TOTAL AMOUNT (USD) | 83,210 |
| TAX AMOUNT | 5,200.63 |
| GRAND TOTAL (AFTER TAX) | 88,410.63 |

452
454 — REQUEST DATE
456 — PRIORITY
458 — SUBMITTER
460 — REQUESTER
462 — PO OWNER
464 — PRE-TAX TOTAL AMOUNT (USD)
466

ADDITIONAL DETAILS

| | |
|---|---|
| COST CENTER | 5410 |
| RECEIVING PLANT | RECEIVING PLANT 1 |
| VENDOR NAME | VENDOR 1 |
| ATF FLAG | ☐ |

| | |
|---|---|
| WATCH LIST | JOHN SMITH |
| PROJECT NAME | LAPTOPS |
| REQUEST | |

468  470  472

PARTICULARS | SHIPPING ADDRESS | PURCHASING DETAILS

| HEADER TEXT | REFER TO QUOTE #JPE1960 DATED 2/13/2018 FOR PRODUCT/SERVICE DESCRIPTION AND PRICING ONLY. PACKING SLIP AND INVOICE SHALL REFERENCE THE COMPANY 2 PO NUMBER |
|---|---|
| DESCRIPTION/ACTIVITY/PROGRAM | COMPANY 3 MONTHLY SHIP T470s & X1 CARBONS 5TH GEN |
| BUYER NOTES | |

450

UPDATE

FIG. 6

| PR LINE ITEMS (2) | APPROVERS (3) | PR TASKS (4) | CONTRACTS | VSPA | | | | | | | |
|---|---|---|---|---|---|---|---|---|---|---|---|
| GO TO [LINE ID ▼] | SEARCH | | | | | | | | | 1 to 2 of 2 | |
| APPROVAL FOR = PR0856066 | | | | | | | | | | | |
| ITEM DESCRIPTION | LINE ITEM TEXT | APPROVER | PARENT ASSET | CHILD ASSET | MATERIAL GROUP | EXPENSE CODE (GL) | QUANTITY | UOM | NET PRICE | DELIVERY DATE | LINE ID |
| ITEM DESCRIPTION 1 | COMPUTER | FALSE | FALSE | MATERIAL GROUP 1 | COMPUTER HARDWARE | 40 | EACH | 1,297.8 | 2018-07-31 | 10 |
| ITEM DESCRIPTION 2 | COMPUTER | FALSE | FALSE | MATERIAL GROUP 2 | COMPUTER HARDWARE | 20 | EACH | 1,364.9 | 2018-07-31 | 20 |

FIG. 7

| | 480 | | | |
|---|---|---|---|---|
| PR LINE ITEMS (2) APPROVERS (3) PR TASKS (4) CONTRACTS VSRA | | | | |
| ≡ APPROVERS   GO TO [STATE] ▽ [SEARCH        ] | | | | ◀◀ ◀ ▽ [  ] 1 TO 3 OF 3 ▶ ▶▶ |
| ▽ APPROVAL FOR = PR0356066 ⎯484 | | | | |
| ⎯516a ⎯518 ≡ STATE | ⎯520 ≡ APPROVER | ⎯522 ≡ COMMENTS | ⎯524 ≡ APPROVAL FOR TASK TYPE | ⎯526 ≡ CREATED |
| ⊙ ● APPROVED | JOHN SMITH | | PURCHASE REQUESTED | 2018-02-21 08:04:05 |
| ⊙ ● APPROVED | JANE DOE | | PURCHASE REQUESTED | 2018-02-14 07:44:20 |
| ⊙ ● APPROVED | TIM JOHNSON | | PURCHASE REQUESTED | 2018-02-21 07:51:05 |

| | | Number | Assigned To | Assignment Group | Active | Activity Due | Additional Assignee List | Approval | Approval History | Approval Set | Business Duration |
|---|---|---|---|---|---|---|---|---|---|---|---|
| 528a | | PRTASK0101638 | JOHN SMITH | PURCHASING | FALSE | UNKNOWN | | NOT YET REQUESTED | | (EMPTY) | |
| 528b | | PRTASK0101639 | JANE DOE | STRATEGIC SOURCING TEAM | FALSE | UNKNOWN | | NOT YET REQUESTED | | (EMPTY) | |
| 528c | | PRTASK0101796 | TIM JOHNSON | rg_ci_us.group | FALSE | UNKNOWN | | NOT YET REQUESTED | | (EMPTY) | |
| 528d | | PRTASK0103120 | JAMES SMITH | PURCHASING | FALSE | UNKNOWN | | | | | |

PARENT=PR0036066

FIG. 11

SYSTEMS AND METHODS FOR GENERATING PURCHASE OUTPUTS BASED ON RECEIVED VOICE INPUT

BACKGROUND

The present disclosure relates generally to generating purchase outputs, such as an invoice, a purchase order, a request for funds, and the like, based on received voice input from a user.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach is generally directed to generating purchase outputs, such as invoices, purchase orders, and the like, based on received voice input received from a user via a client device. The client device, or a device communicatively coupled with a client device, generates a purchase request input based on the received voice input. The purchase request input generally includes data indicative of a requested product or service such as a computer, software, mouse, monitor, and the like. In some embodiments, the purchase request input may include data indicative of an identity or affiliation of the requestor (e.g., group or individual requesting the product), including whether or not the user that submitted the voice input is the requestor or not. Candidate products are identified based on product data and/or requestor information that are stored in a database. In some embodiments, the candidate products may be submitted to the requestor and/or a manager before the purchase output is generated.

BRIEF DESCRIPTION OF THE DRAWINGS

Various aspects of this disclosure may be better understood upon reading the following detailed description and upon reference to the drawings in which:

FIG. 6 show a purchase request form that may be generated based on a voice input and product data stored in a database, in accordance with the present disclosure;

FIG. 7 shows a first tab of purchase management interface that includes information related to submitted, pending, and completed purchase requests, in accordance with the present disclosure;

FIG. 8 shows a second tab of purchase management interface that includes information related to an approval status of records related to purchase requests, in accordance with the present disclosure;

FIG. 9 shows a third tab of a purchase management interface that include information related to purchase request tasks, in accordance with the present disclosure;

FIG. 11 shows dashboard displaying an invoice window, in accordance with the present disclosure.

DETAILED DESCRIPTION OF SPECIFIC EMBODIMENTS

Figure 1:
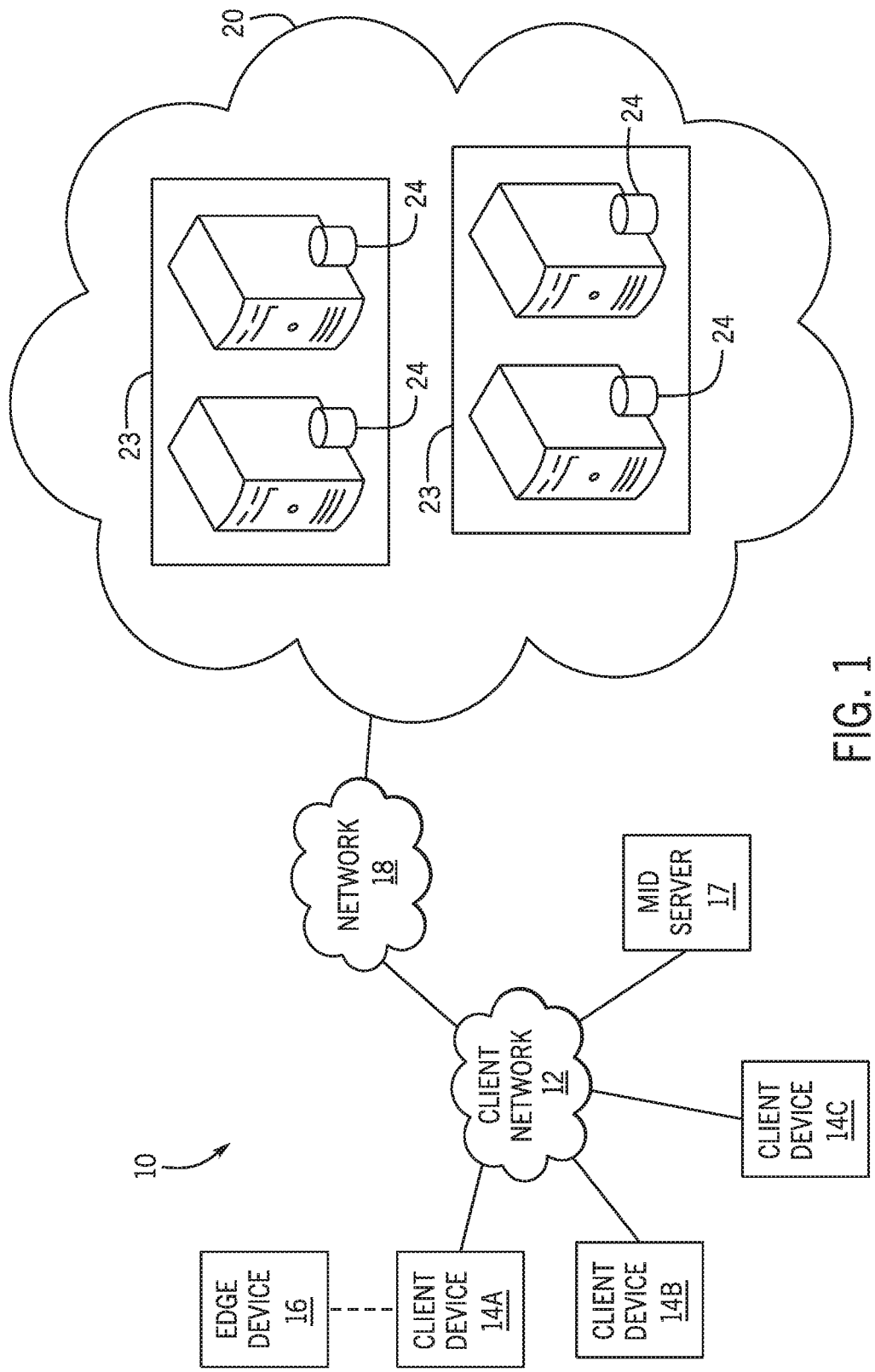
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As discussed herein, cloud computing approaches may improve the efficiency of purchase-related operations performed by an organization. As discussed herein, storing product information, such as products and/or services used by employees and purchases of products and/or services made by the employees, may expedite the process of purchasing products, and thus reduce costs. Further, such stored information may be used to reduce errors when attempting to place an order and/or to automate certain aspects of the purchase process, as discussed herein, that otherwise require human involvement or oversight. For example, an organization may employ devices (e.g., computer, tablets, mobile phones, and the like) having components capable of receiving audio to receive voice input that indicates an intent to purchase a product. Further, the devices (or other devices in communication with the initiating device) may generate a purchase request based on the received input, which may be used to identify candidate products for the user based on the product information associated with the user or users. Additionally, the organization may store vendor-related information that includes metrics associated with vendors used by the organization to purchase certain products. As such, the product information and the vendor-related information may be used to facilitate the process of purchasing products for users within an organization as discussed herein.

With the preceding in mind, the following figures relate to various types of generalized system architectures or configurations that may be employed to provide cloud-based services to an organization and on which the present approaches may be employed. Correspondingly, these system and platform examples may also relate to systems and platforms on which the techniques discussed herein may be implemented or otherwise utilized. Though a cloud-based computing environment is provided by way of one example of a suitable computing framework, it should be appreciated that the present approach may be implemented in other computing environments, including stand-alone computing environments as well as local networks without access to cloud-based resources. With this in mind, and turning to FIG. 1, a schematic diagram of an embodiment of a cloud computing system 10 where embodiments of the present disclosure may operate, is illustrated. The cloud computing system 10 may include a client network 12, a network 18 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 23 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 20 and the network hosting the platform 16. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 16 may be a remote network (e.g., a cloud network) that is able to communicate with the client devices 20 via the client network 12 and network 18. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
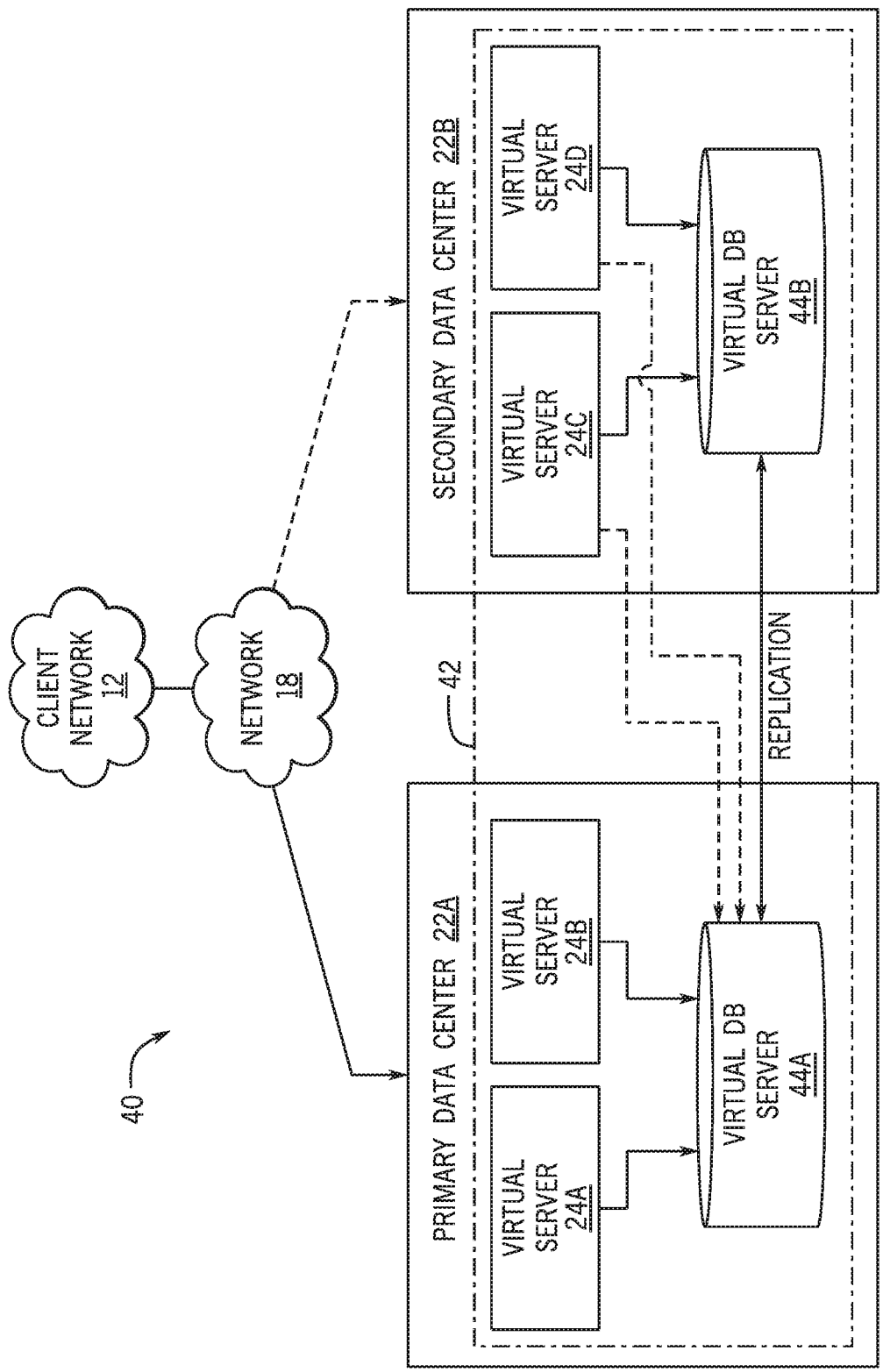
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. In the depicted example, to facilitate availability of the client instance 42, the virtual servers 24A-24D and virtual database servers 44A and 44B are allocated to two different data centers 22A and 22B so that one of the data centers 22 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
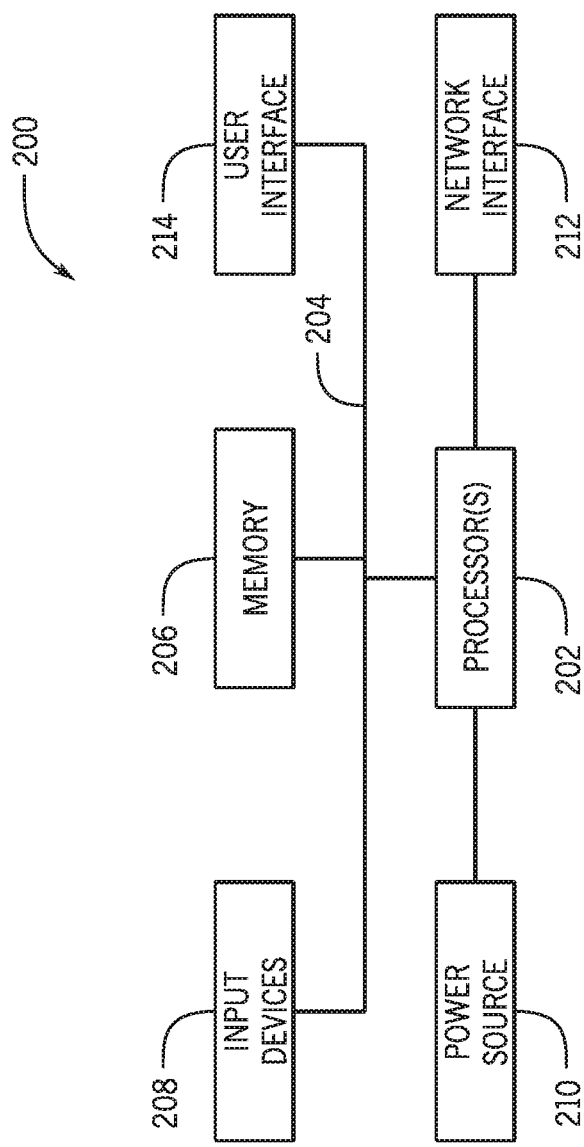
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3 and may be present in the embodiments of FIGS. 1 and 2. FIG. 3 generally illustrates a block diagram of example components of a computing system 80 and their potential interconnections or communication paths, such as along one or more busses 84. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein. The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
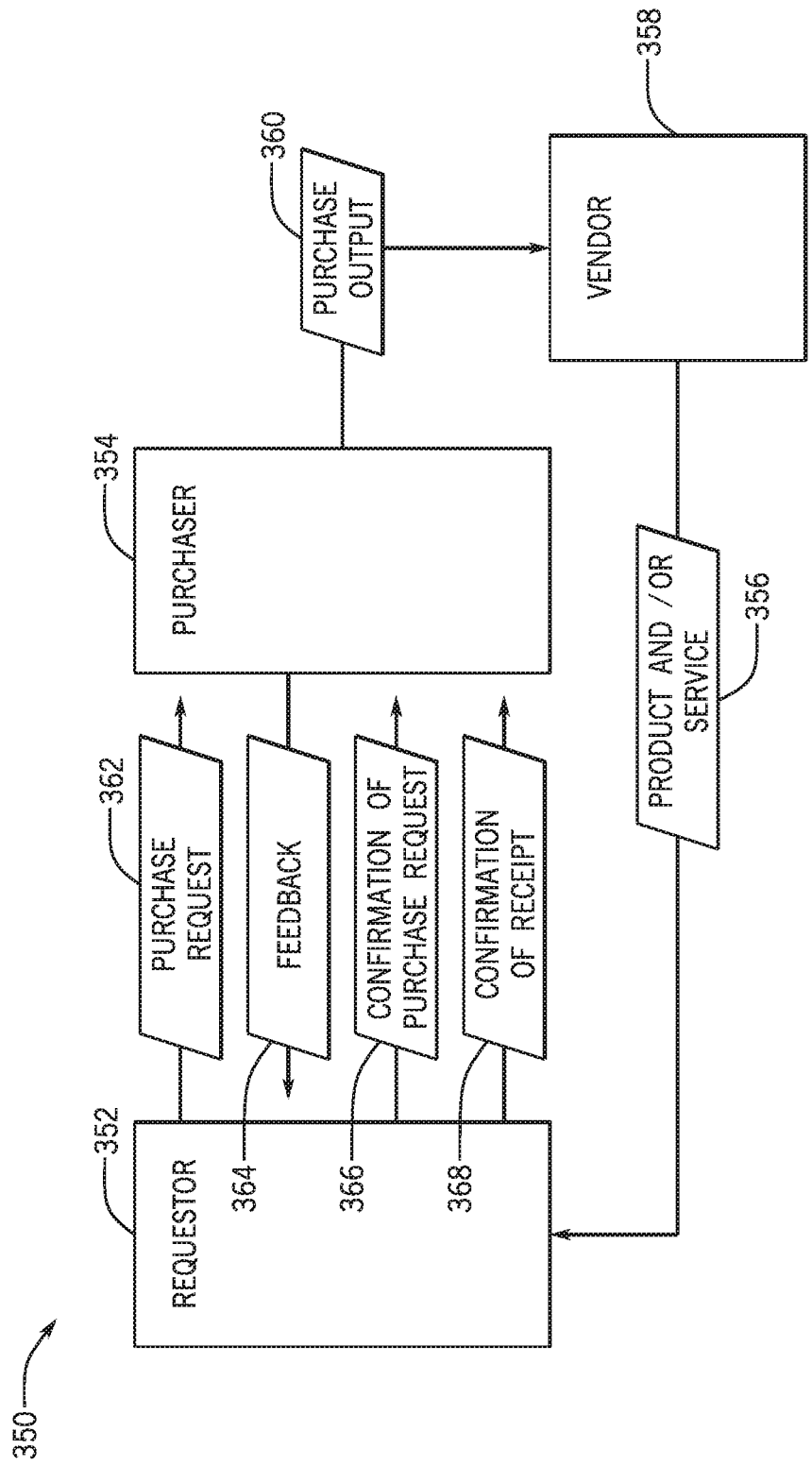
FIG. 4 is a flow diagram for purchasing products and/or services, in accordance with the present disclose.

With the preceding system and cloud-platform overview in mind, FIG. 4 is a flow diagram 350 that shows how an employee of the enterprise may purchase and receive products and services using such systems and/or platforms. It should be noted that at least some of these steps may be executed by a processor, such as processor 82, a processor of a client device, or any suitable processor. Furthermore, the steps illustrated in the flow diagram 350 are meant to facilitate discussion and are not intended to limit the scope of this disclosure, since additional steps may be performed, certain steps may be omitted, and the illustrated steps may be performed in an alternative order from what is shown.

In general, a requestor 352 (e.g., an employee requesting products and services using a client device 14) may communicate with a purchaser 354 (e.g., an employee tasked with managing and executing purchase requests, such as using a different respective client device 14) regarding requested products and services 356 supplied by a vendor 358. As shown in the illustrated flow diagram 350, the requestor 352 may provide a purchase request 362 to the purchaser 354 that generally indicates the products and services requested by the requestor 352. As discussed in more detail below, the purchase request 362 may be provided as a voice input either directly or indirectly by the requestor 352. For example, the requestor 352 may provide a vocal command to a suitable voice input device coupled to the client device 14 associated with the requestor 352 that indicates desired products and/or services 356. Alternatively, the purchase request 362 may be generated by a client device 14 associated with the requestor 352 that is passively monitoring the environment in response to the requestor 352 vocally indicating that the product and/or service 356 is desired by the requestor 352.

In any case, the purchaser 354 may provide feedback 364 to confirm the type of product, quantity of products, brand of the product, and the like, indicated in the purchase request 362. In some embodiments, the feedback 364 may include a list of products and services provided by vendors that the enterprise has contracts with. For example, the purchaser 354, or a computing device associated with the purchaser 354, may generate a list of products and services based on a location of the requestor as different vendors 358 may serve (or be contracted to serve) different sites associated with an enterprise to which the requestor 352 and purchaser 354 belong. In some embodiments, the feedback 364 may indicate that the brand of the product is from a vendor 358 that the enterprise does not have an existing contract with. As such, the feedback 364 may prompt the requestor 352 to confirm whether or not a contract with a new vendor should be opened.

In response to the feedback 364, the requestor 352 may provide a confirmation of request 366. In some embodiments, the confirmation of request 366 may modify the purchase request 362, such as changing the type, quantity, brand, and so forth. In some embodiments, the confirmation of request 366 may include an approval of opening the new contract with the vendor.

In response to receiving the feedback 364, the purchaser 354 may generate a purchase output 360, which may include a request to open a contract, a purchase request, and the like. In response to receiving the purchase output 360, the vendor 358 may provide the product and/or service 356 to the requestor 352. In response to receiving the product and/or service 356, the requestor 352 may submit a confirmation of receipt 368 that indicates that the purchase has been completed. As such, the purchaser 354 may submit an additional purchase output 360 that includes payment for the product and/or service 356.

Figure 5:
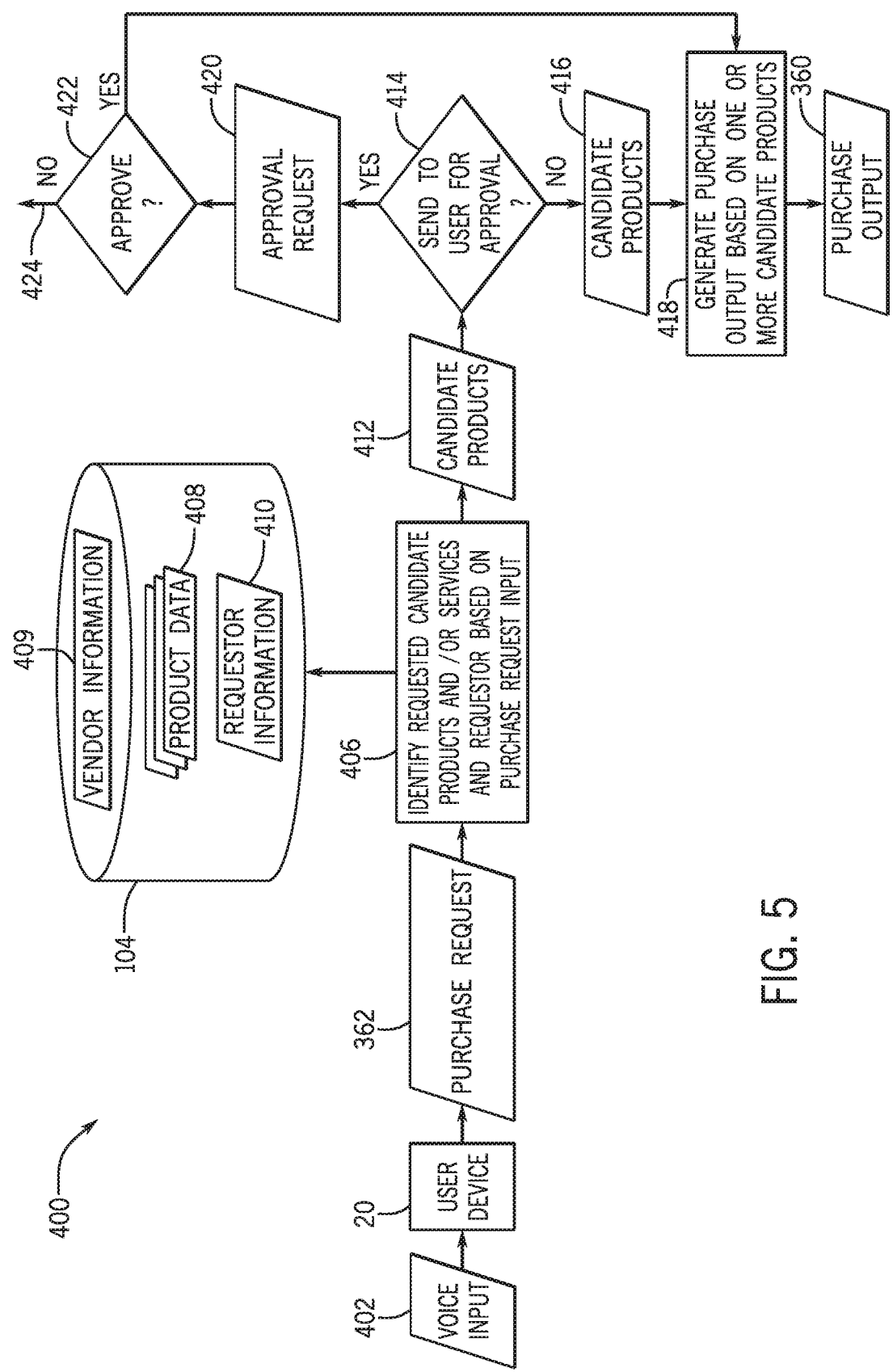
FIG. 5 is a flow diagram for generating a purchase output based on a received voice input, in accordance with the present disclosure.

To further illustrate FIG. 4, FIG. 5 is a flow diagram 400 that shows how various purchase outputs 360 may be generated based on voice input 402 received by a client device 14. It should be noted that at least some of these steps may be executed by a processor, such as processor 82, a processor of a client device, or any suitable processor. Furthermore, the steps illustrated in the flow diagram 400 are meant to facilitate discussion and are not intended to limit the scope of this disclosure, since additional steps may be performed, certain steps may be omitted, and the illustrated steps may be performed in any order.

In general, the voice input 402 may be vocal instructions spoken by a user (e.g., the requestor 352) that includes an intent to purchase and/or inquire about a product or service. In some embodiments, the voice input 402 may include words or phrases that indicate a vendor providing the product or service. The voice input 402 is received by a user device 20 with suitable hardware for receiving voice input, such as a voice recording device (e.g., a microphone). In some embodiments, the voice input 402 is received by the client device 14 in response to the user toggling a physical button, soft button (e.g., as part of a software application), and/or based on the user speaking certain words (e.g., voice commands associated with purchasing products) that indicate an intent to purchase a product. In some embodiments, the client device 14 is continuously recording or monitoring (e.g., while the user is logged into their profile).

The client device 14 may output the purchase request 362 based on the voice input 402. For example, the client device 14 may have suitable software for translating the sound communication (e.g., the voice input 402) to a suitable digital or electronic format. In some embodiments, the client device 14 may include or be communicatively coupled (e.g., via a network connection, blue tooth, USB, and the like) to a voice communication device capable of receiving the voice input 402 via a recording device, such as by an employee speaking within a distance where the voice communication device is capable to receiving sound. As such, the client device 14 and/or the voice communication device may produce an electronic purchase request 362 based on a translated voice input 402. In some embodiments, the client device 14 may generate the purchase request 362 when the voice input 402 includes words or phrases indicative of the user's intent to purchase a product. For example, the purchase request 362 may include data indicative of the product, the service, and the vendor associated with the product.

After receiving the purchase request 362, the processor 82 of the client device 14 associated with the requestor 352 and/or the purchaser 354 may identify (process block 406) candidate product(s) 412 and/or service(s) requested by the requestor 352 based on the purchase request 362. For example, the purchase request 362 may include data indicative of a specific brand or general type of product that the requestor 352 is requesting, such as a computer. Then, in response to receiving the purchase request 362, the processor 82 may access the database 104 associated with the enterprise and retrieve product data 408, and/or service data, associated with the purchase request 362. The product data 408 may be a list, picture data, or other data that identifies and/or characterizes product data. In some embodiments, the product data 408 may include vendor information 409 such as an identity of the vendor, a vendor rating, metric data that includes a rated history of transactions with the vendor, existing contracts between the vendor, and the like. For example, the vendor information 409 may include an approved vendor list that users may purchase from. In some embodiments, the approved vendor list of the vendor information 409 may be associated with the physical location where the requestor and/or purchaser performs business operations. For example, an enterprise may have different physical locations for conducting different enterprise operations. The approved vendor list for one physical location may be different from the approved vendor list for another location due to certain considerations, such as cost of delivery, availability of vendors in a region around a physical location, and the like.

In some embodiments, the processor 82 may identify (process block 406) the one or more candidate products 412 and/or services based on an identity or affiliation of the requestor 352 associated with the purchase request 362. For example, the purchase request 362 may include identity data that identifies the requestor 352, such as an individual or group for whom the purchase request 362 is made for. In some embodiments, the identity data includes metadata associated with the client device 14 that received the voice input 402 and/or generated the purchase request 362. The metadata may identify the request based on a user profile logged into the client device and/or based on vocal characteristics (e.g., pitch, inflection, pattern of speech, and the like) of the voice input 402 that may be indicative of the requestor.

In some embodiments, the voice input 402 may not be submitted by the requestor 352. As such, the processor 82 of client device 14 may submit a first request for user input to determine if the user who submitted the voice input 402 is the requestor 352, the purchaser 354, or any employee speaking on behalf of the requestor 352. In some embodiments, the first request may be a window to be displayed on the client device 14 that includes a selection. In some embodiments, the request may be an audio output that prompts the user to indicate whether the user is the requestor. If the user input does not indicate that the user is the requestor 352, then the processor 82 may submit a second request for the user to identify the requestor in a generally similar manner as the first request.

In any case, the processor 82 may retrieve one or more product data 408 based on the purchase request 362. For example, the processor 82 may access data stored in the database 104 that identifies and retrieves certain product data 408 that may be the requestor's preference. For example, the processor 82 may retrieve product data 408 of a certain brand that the requestor 352 typically uses or is in possession of. In some embodiments, the processor 82 may also retrieve product data 408 having certain specifications, such as monitors of certain sizes and resolutions, a computer mouse with certain dots per inch (DPI), number of buttons, programmable features, and the like. In some embodiments, the processor 82 may search data stored in the database 104 that identifies products and/or services that enterprise current owns, such as products stored in a stock room associated with the enterprise.

In some embodiments, the processor 82 may identify and retrieve the products based on the location of the requestor 352. For example, the processor 82 may retrieve product data 408 from the stock room that is in the same location of the requestor. Alternatively, the processor 82 may determine what existing contracts exist between the enterprise associated with the location of the requestor 352 and vendors selling the products indicated by the purchase request 362. In some embodiments, the identified and retrieved product data 408 are outputted as candidate products 412 by the processor 82 of the requestor 352 and/or purchaser 354.

In some embodiments, the processor 82 may determine that a contract does not exist between the enterprise and the vendor associated with the products indicated by the purchase request 362. As such, the candidate products 412 may be tagged or include data indicating that a new contract needs to be generated before the candidate products 412 may be purchased.

In some embodiments, processor 82 may determine (decision block 414) whether the candidate products 412 require approval before a purchase output 360 is generated (decision block 418). That is, the candidate products 412 may require feedback (e.g., feedback 364) and/or approval by a user (e.g., the requestor 352, purchaser 354, administrator, or manager) before the purchase output 360 is generated. For example, the processor 82 may determine whether approval is needed based on whether the requestor 352 and/or purchaser 354 have suitable permissions to purchase items. Additionally, the processor 82 make the determination based on whether the product to be ordered is a reorder to replace products maintained by the enterprise, such as in a stock room. If the processor 82 determines, at decision block 414, that an approval is not required, the processor 82 may generate the purchase output 360.

Returning to decision block 414, the processor 82 may determine that an approval is required. As such, the processor 82 may generate an approval request 420 that includes the candidate products 412. In some embodiments, the approval request 420 may reference or identify one of the candidate products 412. Additionally, the approval request 420 may indicate the requestor 352, a priority of the purchase, the type of product, the vendor, and the like. In some embodiments, the approval request 420 may include a recommendation to the administrator of whether the purchase should be made, such as based on finances or the rating of the product. In some embodiments, the recommendation may include a different vendor on a different approved vendor list, such as when the vendor on a current vendor list is out of stock of the product, selling the product at a greater price, and other purchase-related considerations. Additionally, the approval request 420 may indicate that a contract should be opened to purchase the items.

For example, the requestor 352 may receive an approval request 420 that identifies the one or more candidate products 412 as well as product data 408 and vendor information 409 associated with the candidate products 412. The requestor 352 may approve (decision block 422) the approval request 420 the candidate products 412 based on the information provided in the approval request 420.

For example, at decision block 422, the requestor 352 may provide an input indicative of a selection of the one or more candidate products resulting in a subset of the one or more candidate products based on the preference of the requestor and/or user. As such, the processor 82 may generate (process block 418) a purchase output 360 to be submitted to the vendor 358 that include the selected candidate products.

Additionally or alternatively, the approval request 420 may be transmitted to the purchaser 354, an administrator, purchase manager, and the like. For example, the requestor 352 may not have suitable permissions for purchasing products based on, for example, the cost of the product or the role of the requestor. Accordingly, upon receiving approval (e.g., at decision block 422) by the purchaser 354, the administrator, the purchase manager, and the like, the processor 82 may generate the purchase output 360. In some embodiments, the purchase output 360 may be an invoice, a request to open a contract between the enterprise and a vendor, a purchase order, a request for an individual (e.g., requestor, manager, administrator) to add more funds to complete a purchase of a product, and the like.

As another non-limiting example, the approval request 420 may indicate that a contract does not exist between the vendors associated with the candidate items 412 indicated in the approval request 420. As such, the approval provided by the user at decision block 422 may indicate that a contract be opened between the enterprise and the vendor associated with the candidate items 412. Accordingly, the purchase output 360 may be a request to open a contract of sale between the vendor and the enterprise. In this way, the techniques disclosed herein facilitate generating and managing contracts between enterprises and vendors.

In some embodiments, the approval request 420 may include a recommendation that the purchaser 354 delay generating a purchase output such as the request for products and/or services, based on vendor information 409 and/or requestor information 410. For example, the vendor information 409 may indicate that the vendor associated with the candidate products 412 is having a sale on a different date, a rate for the candidate products 412 is lower if the purchaser 354 orders additional products and/or services, and other vendor-specific considerations. As another non-limiting example, the recommendation may be based on requestor information 410 that indicates fiscal considerations (e.g., time-specific and/or project-specific budgets). As such, the recommendation may indicate that the user not approve the approval request 420 at this time and delay the purchase for another date based on the vendor-specific considerations and/or fiscal considerations.

To further help illustrate the steps in the flow diagram 400 of FIG. 5, FIG. 6 shows a purchase request form 450 (as may be depicted on a graphical user interface) with fields that may be filled in by the processor 82, the requestor, the administrator, or both to generate the approval request 420. As shown in the illustrated embodiment of the purchase request form 450, the purchase request form 450 includes identity fields 452 that include the purchase request number, a request type (e.g., "New purchase order (PO)"), PO number, PO type, type of commerce, a company code, and a type of currency that may be related to the company code. The purchase request form 450 may include additional information fields that identify the request date 454, a priority 456, submitted 458 (e.g., the user who submitted the voice input 402), the requestor 460, the PO owner 462, fields associated with the cost of the product 464.

The illustrated embodiment of the purchase request form 450 shown in FIG. 6 also includes an additional details window 466 that may further specify information related to a purchase order to be generated, such as the receiving plant, vendor name, a project associated with the purchase order, and the like. The additional details window 466 may also include one or more selectable tabs that display purchase order related information, such as a particulars tab 468 that describes what the purchase is for, a shipping address tab 470, and a purchasing details tab 472.

To further help illustrate the steps in the flow diagram 400 of FIG. 5, FIG. 7 shows a purchase management interface or screen 480 that includes information related to pending and/or completed purchase requests. In general, the administrator may have access to the purchase management interface 480 to track pending purchases such as the status of approval, the products being request, and the like. As shown in the illustrated embodiment of the purchase management interface 480, the purchase management interface 480 includes a purchase request (PR) line product tab 482, approver's tab 484, PR tasks tab 486, contracts tab 488, and VSRA tab 490. The purchase management interface 480 shown in FIG. 6 is displaying fields associated with the PR line product tab 482, which includes records 492a and 492b that are related to purchase requests. Each record 492 has fields such as product description field 494, line product text field 496, model category 498, parent asset field 500, child asset field 502, materials group field 504, expense code field 506, quantity fields 508, price field 510, and delivery data field 512.

To further help illustrate the steps in the flow diagram 400 of FIG. 5, FIG. 8 shows the purchase management interface 480 that includes information related to pending and/or completed purchase requests. The purchase management interface shown in FIG. 8 is displaying the fields associated with the approver's tab 484, which includes records 516a, 516b, and 516c that are related to purchase requests awaiting approval. Each record 516 has fields such as approval state field 518 that indicates an approval status (e.g., whether or not the purchase requests have been approved) an approver field 520 that identifies an employee tasked with approving the purchase request associated with each record 516, a comment field 522, and a task type field 524. As shown, the task type field 524 indicates that the records 516a, 516b, and 516c are associated with purchase requests To further help illustrate the steps in the flow diagram 400 of FIG. 5, FIG. 9 shows the purchase management interface 480 that includes information related to pending and/or completed purchase requests. The purchase management interface 480 shown in FIG. 9 is displaying the fields associated with the PR tasks tab 486, which includes records 528a, 528b, 528c, and 528d that are related to purchase requests. Each record 528 has fields such as a PR number field 530 that identifies the purchase request associated with the field 528, an assignment field 532 that identifies an employee that the purchase request associated with the field 528 is assigned to (e.g., for approval), an assignment group field 534 that indicates a group associated with purchase request awaiting approval, an activity field 536, an activity due field 538, an additional assignee list field 540, an approval field 542, an approval history field 544, an approval set field 544, and a business duration field 548.

Figure 10:
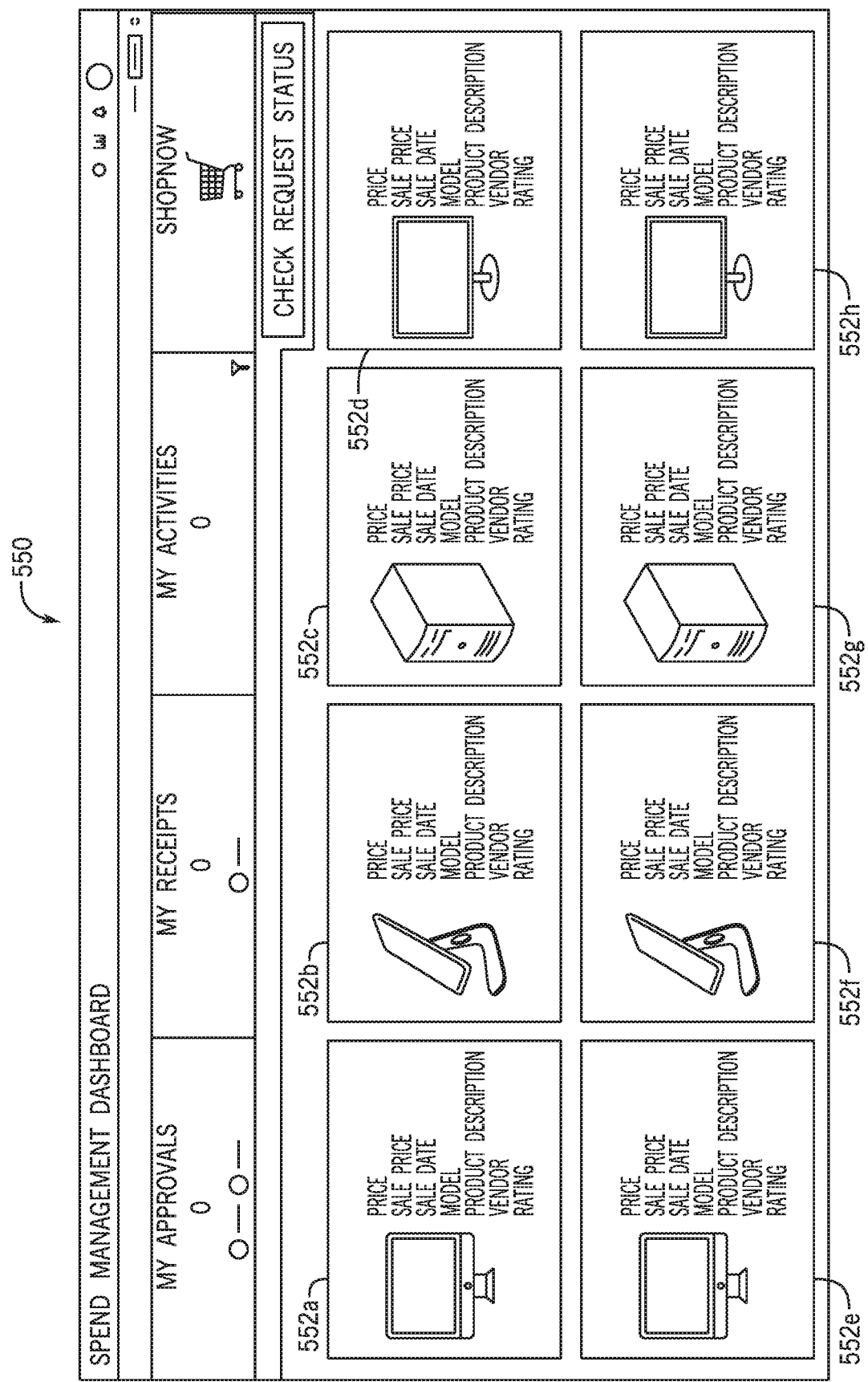
FIG. 10 shows a dashboard displaying product icons, in accordance with the present disclosure.

To further help illustrate the steps in the flow diagram 400 of FIG. 5, FIG. 10 illustrates a dashboard 550 (e.g., a graphical user interface configured to present information and/or selectable options in an organized and easy to view manner) that a user, requestor, and/or an administrator may interact with during the various steps of the flow diagram 400 shown in FIG. 4. In general, the dashboard 550 displays one or more products as product tiles or icons 552 along with metrics and/or descriptions of the products. For example, as shown in the illustrated embodiment of the dashboard 550 of FIG. 10, each product icon 552a, 552b, 552c, 552d, 552e, 552f, 552g, and 552h displays product data that includes a pictorial representation, a price, a sale price, a model, a product description, a vendor identity, and a rating that may be associated with the vendor and/or the product. It should be noted that the product data may generated based on the product data 408 stored in the database 104 associated with the enterprise. For example, the rating may be based on ratings submitted by employees of the enterprise. For example, the dashboard 550 may be implemented to present the candidate products 412 identified in process block 406 to the user or requestor via a display of a client device 14. Additionally or alternatively, the dashboard 550 may be implemented to present the candidate products 412 and/or approval request 420 identified in process block 406 to the user or requestor via a display of a client device 14.

Figure 11:
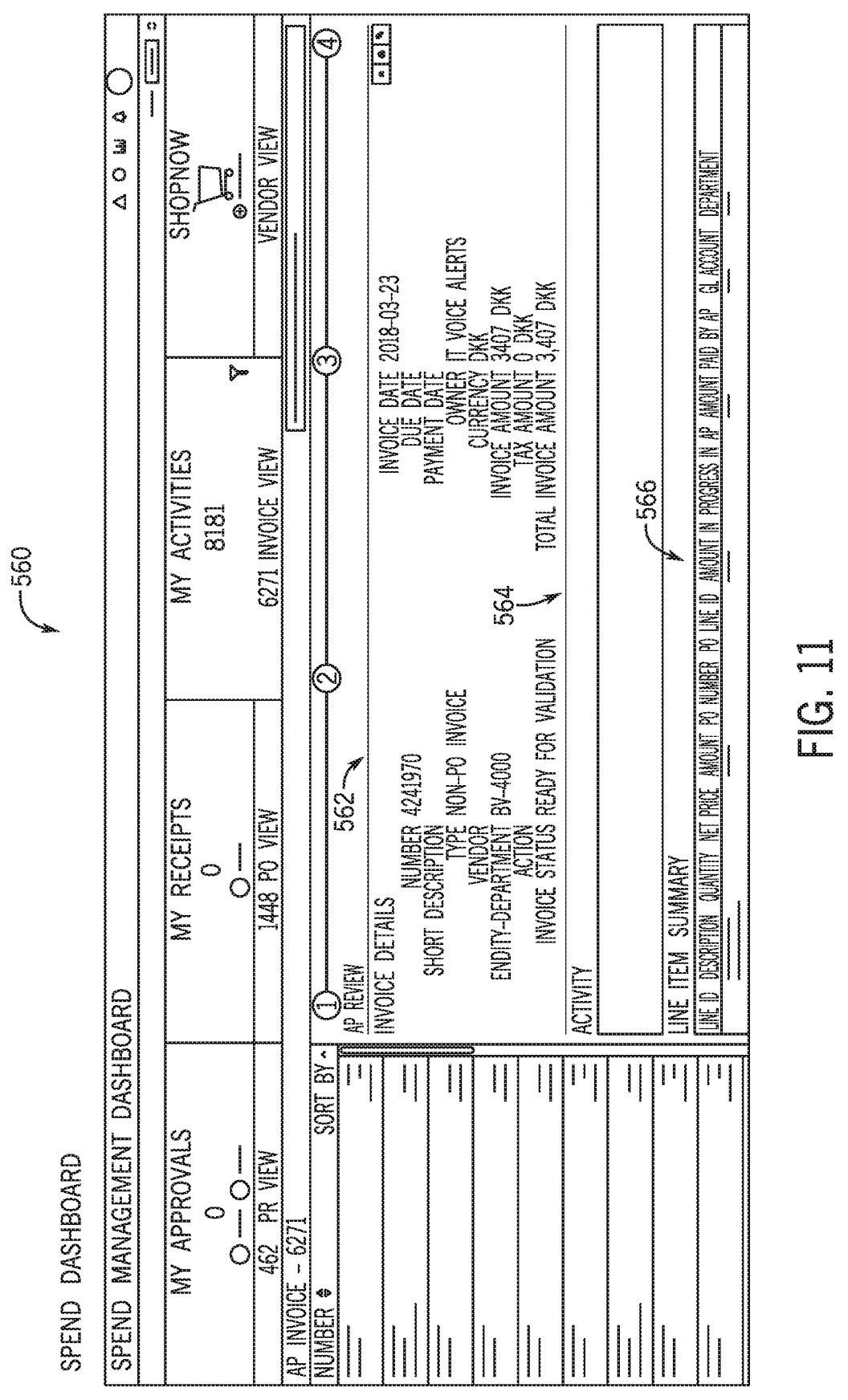

To further help illustrate the steps in the flow diagram 400 of FIG. 5, FIG. 11 illustrates a requestor dashboard 560 that the requestor or individual associated with the requestor may interact with to check the status of purchase requests and receive purchase outputs. As shown in the illustrated embodiment of the requestor dashboard 560 of FIG. 11, the requestor dashboard 560 includes an invoice window 562 that displays an invoice generated based on a requested product as discussed herein. Additionally, the invoice window 562 of the requestor dashboard 560 may include an activity window 564 that summarizes activity of the requestor, such as submitted purchase requests, identified candidate products awaiting approval, received purchase orders, received invoices, and the like. Further, the invoice window 562 of the requestor dashboard 560 may include an activity window 564 that includes information relevant to the invoice associated with the invoice window 562, such as a description of the product, an amount to pay, a quantity, an amount paid, an associated department, and the like.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
 a non-transitory, machine-readable medium storing code for performing one or more operations; and
 a client instance hosted by one or more data centers, wherein the client instance is accessible by one or more remote client networks comprising one or more client computing devices configured to receive audio data input, the system is configured to perform the one or more operations comprising:
 receiving a request for a good or service initiated at a respective client computing device based on a respective audio data input, wherein the audio data input comprises a voice input from a requestor of the good or service;
 determining requestor information comprising a physical location associated with the respective client computing device;
 identifying a plurality of candidate products from a database accessible by the client instance based on the request, the requestor information, and product availability data associated with a storage site of an organization associated with the physical location to which the requestor belongs;
 receiving a selection of a candidate product of the plurality of candidate products from the requestor;
 determining availability of the selected candidate product at the storage site of the organization associated with the physical location to which the requestor belongs such that the storage site is checked for availability of the selected candidate product before an additional storage site associated with a different organization is checked; and
 in response to determining the selected candidate product is available at the storage site of the organization associated with the physical location to which the requestor belongs:
 automatically generating an approval for acquisition of the selected candidate product by the requestor; and
 generating an acquisition output for the requestor based on the selected candidate product and the approval.

2. The system of claim 1, wherein the plurality of candidate products are identified based on an existing contract between an enterprise associated with the client device and a vendor associated with the one or more candidate products.

3. The system of claim 2, wherein the requestor information further comprises an identity of products currently owned by the requestor, an identity of products previously owned by the requestor, or both.

4. The system of claim 2, wherein the plurality of candidate products are identified based on one or more distribution locations associated with the enterprise where the requestor works.

5. The system of claim 1, comprising outputting a purchase request to an additional client device based on the identified plurality of candidate products.

6. The system of claim 1, wherein the acquisition output comprises an invoice, a purchase order, a request for additional funds, or any combination thereof.

7. The system of claim 1, wherein the system is configured to perform the one or more operations comprising:
 in response to determining the selected candidate product is not available at the storage site of the organization associated with the physical location to which the requestor belongs:
 identifying the selected candidate product from the database accessible by the client instance based on the request, the requestor information, and existing vendor contracts associated with the enterprise; and
 generating the acquisition output for the requestor based on the selected candidate product and the existing vendor contracts.

8. The system of claim 1, wherein the system is configured to perform the one or more operations comprising:
in response to determining the selected candidate product is not available at the storage site of the organization associated with the physical location to which the requestor belongs:
generating an alternative product recommendation;
receiving a selection of the alternative product recommendation from the requestor; and
generating the acquisition output for the requestor based on the alternative product recommendation.

9. A system, comprising:
a database storing product availability data indicating an availability of products in a plurality of storage sites each associated with a different physical location associated with an enterprise;
a non-transitory, machine-readable medium storing code for performing one or more operations; and
a client instance hosted by one or more data centers, wherein the client instance is accessible by one or more remote client networks comprising one or more client computing devices configured to receive audio data input, wherein the system is configured to perform the one or more operations comprising:
receiving a request for a good or service initiated at a respective client computing device based on a respective audio data input, wherein the audio data input comprises a voice input by the client device from a requestor of the good or service;
determine a physical location of the enterprise associated with the requestor;
retrieve product availability data based on the physical location of the enterprise associated with the requestor;
identifying a plurality of candidate products based on the request and the product availability data;
receiving a selection of a candidate product of the plurality candidate products from the requestor;
determining availability of the selected candidate product at a storage site at the physical location of the enterprise associated with the requestor such that the storage site is checked for availability of the selected candidate product before an additional storage site associated with a different organization is checked;
in response to determining the selected candidate product is available at the storage site at the physical location of the enterprise associated with the requestor:
automatically generating an approval for acquisition of the selected candidate product by the requestor; and
generating an acquisition output based on the selected candidate product and the approval.

10. The system of claim 9, wherein the system is configured to perform the one or more operations comprising:
in response to determining the selected candidate product is not available at the storage site at the physical location of the enterprise associated with the requestor:
identifying the selected candidate product based on an approved vendor list stored in the database, wherein the approved vendor list comprises contracts between the enterprise at the physical location and vendors associated with the physical location.

11. The system of claim 10, wherein the identified selected candidate product are not included in the approved vendor list; and wherein the purchase output is a contract request.

12. The system of claim 9, the acquisition output is generated based on a metric score of a vendor associated with a respective candidate product of the plurality of candidate products.

* * * * *